Patented Dec. 5, 1922.

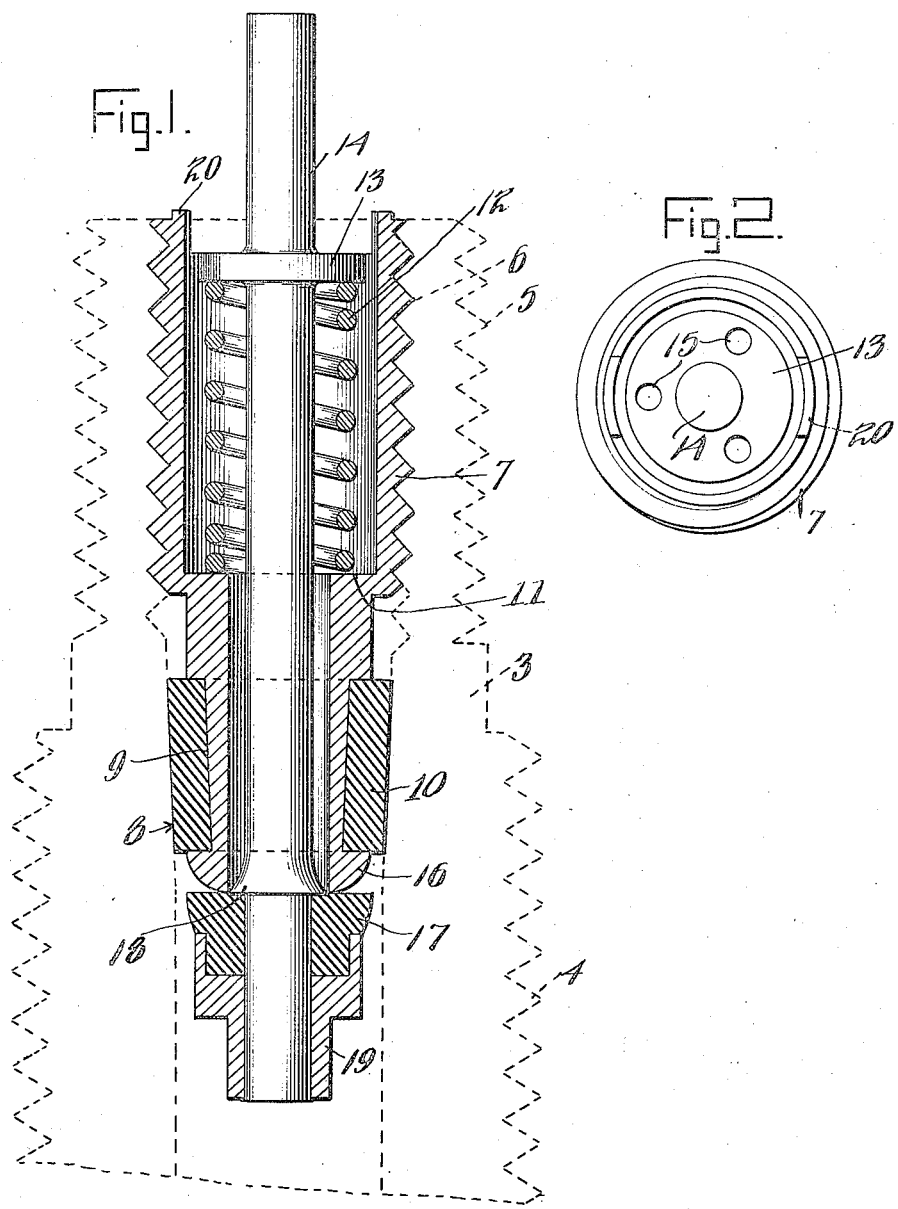

1,438,081

UNITED STATES PATENT OFFICE.

MARCUS ALLEN, OF LOS ANGELES, CALIFORNIA.

VALVE.

Application filed January 18, 1921. Serial No. 438,190.

*To all whom it may concern:*

Be it known that I, MARCUS ALLEN, a citizen of Great Britain, residing at Los Angeles, in the county of Los Angeles and State of California, have invented certain new and useful Improvements in Valves, of which the following is a specification.

My said invention consists of an improved tire valve, and the object of the same is to provide a valve that shall be easily removed and replaced, that shall act efficiently to retain air in the tire, that can be readily manipulated to permit escape of the air in the tire, and whose parts shall be few in number and simple in construction.

Referring to the accompanying drawings which are made a part hereof and on which similar reference characters indicate similar parts, Figure 1 is a vertical section of my improved device, and

Figure 2, a plan.

In the drawings 3 denotes the outer casing of a tire valve externally threaded at 4 for attachment to a wheel rim by a clamping nut and having threads at 5 for a cap. This casing also has internal threads at 6 for engagement by the threads of an inner casing 7.

Below the latter threaded portion the outer casing is tapered internally at 8 and the inner casing is correspondingly tapered externally at 9, the two surfaces being concentric and equally spaced at all points. A resilient packing 10 which may be a flat strip of rubber about the casing 7 or a piece of rubber tubing is interposed between surfaces 8 and 9 to prevent escape of air between valve casings 3 and 7.

Between the ends of the valve and preferably near the middle is a ledge 11 on which rests a spring 12, the other end of the spring bearing against an annular enlargement or collar 13 of a stem 14. The collar may fit snugly within the upper end of casing 7 which is preferably enlarged to provide a chamber whose lower end is defined by ledge 11. The collar 13 is perforated at 15 to permit free passage of air from the chamber to the outer atmosphere, so as not to retard movement of the valve stem 14. I may change the number and shape of the perforations, or omit them entirely within the scope of my invention. I may also vary the form of enlargement 13, the only condition necessary being that it must confine the spring so as to lift stem 14 and hold washer 17 against its seat, while yet permitting the stem to be moved downward readily.

At its lower end the inner casing has a face 16 which is preferably rounded as shown, but which may be left flat if desired, or may have a conical or other desired form. Engaging this face is a washer 17 which is held between an enlargement 18 of stem 14 and a cup 19 thereon, the washer at its lower end resting in the cup and having a flange extending over its upper edge. The flange 18 is here shown as flat on its lower face and tapering sharply toward the stem at its upper side, the outer edge of the flange being sharp. The purpose of this is to insure a substantially complete opening of the valve at its first movement when the valve is new or if the washer 17 is worn or distorted to insure substantially complete opening as soon as the flange passes the lower edge of the casing. Obviously the flange may be flat at both sides or otherwise of different shape provided the result is obtained. The cup may be secured in place by burring the lower end of the stem, or in any other convenient manner.

At its upper end the casing 7 has lugs or extensions 20 for engagement as by a screw driver or other like means to turn the inner casing and remove it from the tire.

I do not limit myself to the particular embodiment of the invention shown in the drawings as various modifications will occur to those skilled in the art the true scope of the invention being shown in the appended claim.

Having thus fully described my said invention, what I claim as new and desire to secure by Letters Patent, is:

In a tire valve, a tubular outer casing threaded at its upper end, and having an inwardly tapered shoulder below the threaded portion, an inner casing having threads to coact with those of the outer casing and having an external taper to correspond to that of the outer casing, a resilient spacer of uniform thickness between said tapered surfaces, shoulders on the inner casing contacting with each end of the washer, the outer face of the casing tapering from the lower shoulder to meet the inner face at the bottom, a stem in the casing, an integral collar thereon spaced from the wall of the inner casing, and having openings for the passage of air, a seat on said inner casing, a spring between said seat and said collar, a flange on the stem having a flat lower face and an upper face tapering sharply to its intersection with the lower face, a resilient washer contacting with said flange and the lower end of the inner casing and extending nearly to the outer casing and a cup fast to the stem and containing a downward extension of the washer, substantially as set forth.

In witness whereof, I have hereunto set my hand and seal at Los Angeles, California this 8th day of December, A. D. nineteen hundred and twenty.

MARCUS ALLEN. [L. S.]

Witnesses:
HALLIE DYOTT,
ANNA C. ALLEN.